United States Patent Office 2,984,180
Patented May 16, 1961

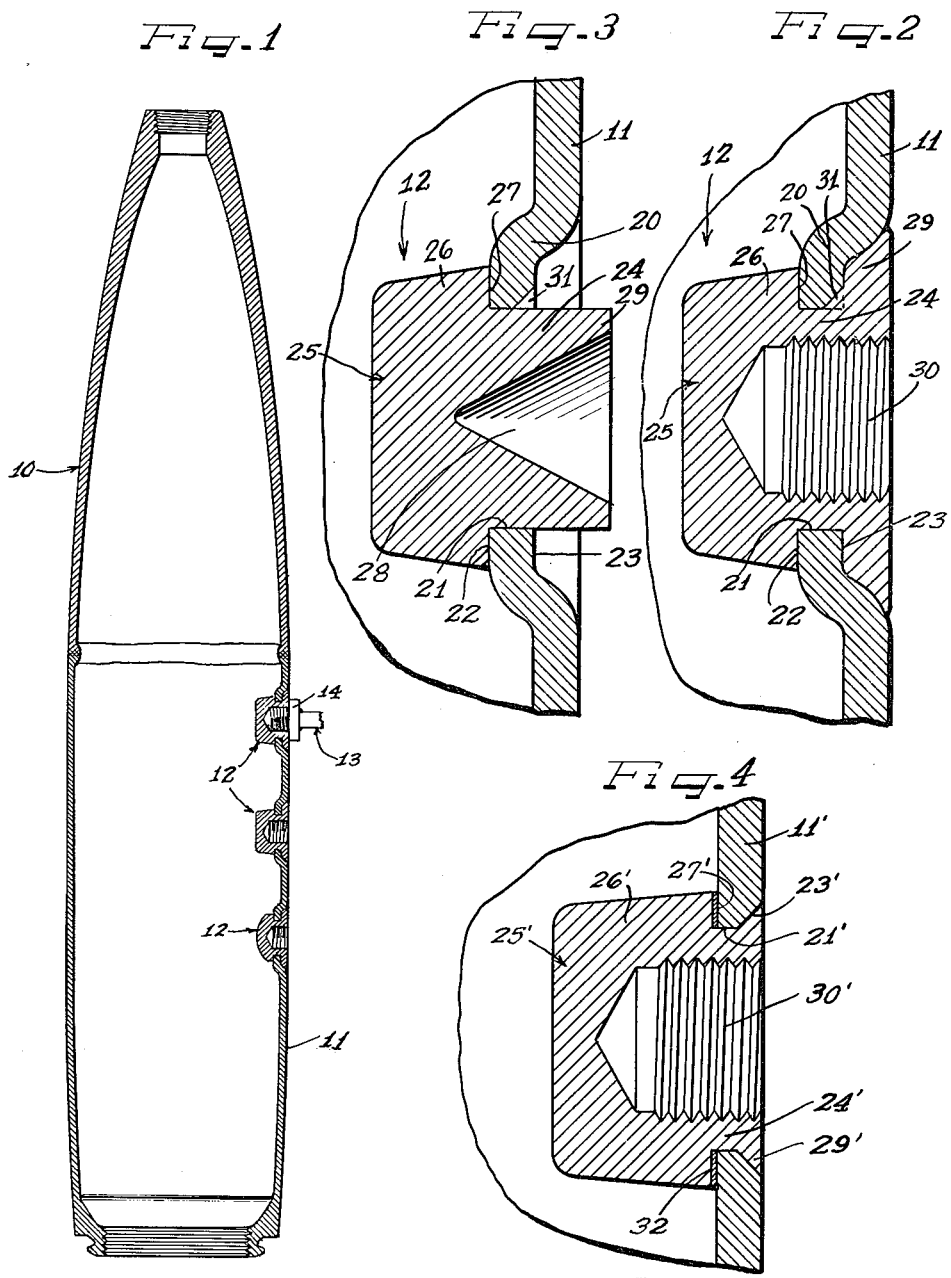

2,984,180

BOMB HANGER SOCKET STRUCTURE

George Albert Lyon, 13881 W. Chicago Blvd., Detroit 28, Mich.

Filed Jan. 13, 1955, Ser. No. 481,642

2 Claims. (Cl. 102—2)

This invention relates to a socket structure by means of which a bomb may be suspended or hung from the lower side of an airplane and more particularly to a stud type socket that lends itself to simple and economical attachment to the wall of a bomb casing.

In the suspension of a modern streamlined bomb in a horizontal position from the underside of an airplane, it is very important that the bomb casing be provided with foolproof sockets to which can be readily attached hangers or drop rings for attaching the bomb to a plane. Some efforts have been made to weld such sockets to the bomb casing but due to the relatively great length of the casing special welding apparatus must be provided for extension in the casing to the socket zone area.

It is an object of this invention to provide a simple but inexpensive way of attaching bomb hanger or drop ring sockets to the wall of a bomb casing which dispenses with the necessity of any welding operations.

Another object of this invention is to provide a positive and foolproof fastening for a bomb hanger or drop ring socket in the wall of a bomb casing.

In accordance with the general features of this invention, there is provided in a hanger socket for a bomb and the like, an apertured wall integral with the bomb casing and with one end of the aperture aligned with an enlarged opening on the outer side of the wall, a stud including a head in shouldered engagement with an inner surface of the wall and having a shank extending through the aperture with its end on the outer side of the wall flared radially outwardly into the enlarged opening about the aperture to hold the stud interlocked with the wall, the shank having an internal socket to receive detachably therein a hanger element.

In accordance with other features of this invention, there is provided two forms of the invention in one of which the stud head is seated on a flattened wall portion about the stud aperture in the wall and in the other of which the stud head has a shouldered configuration conforming with the inner cylindrical shape of the portion of the casing about the aperture in the wall of the stud.

Other features relate to the provision of means for preventing turning of the stud in the aperture in the bomb wall casing.

Other objects and features of this invention may more fully appear from the following detailed description taken in connection with the accompanying drawings which illustrate several embodiments thereof and in which—

Figure 1 is a fragmentary cross sectional view through a streamlined bomb casing having hanger or drop ring sockets embodying the features of this invention;

Figure 2 is a fragmentary enlarged cross sectional view through one of the sockets corresponding to a portion of Figure 1;

Figure 3 is a fragmentary cross sectional view similar to Figure 2 but showing the condition of the outer end of the stud shank prior to being interlocked to the casing wall and also to it being provided with a threaded socket; and Figure 4 is a fragmentary cross sectional view similar to Figure 2 showing a modification of the invention wherein the stud head is applied directly to the inner cylindrical surface of the bomb casing wall.

As shown on the drawings:

The reference character 10 designates generally a cylindrical and tapered bomb casing such as is adapted to be carried on the underside of an airplane. This casing may be made of any suitable metallic material such, for example, as steel or the like.

The cylindrical wall 11 of this casing is provided with a series of one-piece studs having sockets or stud socket structures designated generally by the reference character 12 in which hanger elements or drop rings can be detachably socketed for suspending the bomb from the underside of the airplane. The stud sockets on the studs open only radially outwardly of the casing 10. One such element is shown more or less generally at 13 and which has a shouldered and threaded end 14 in threaded detachable cooperation with the socket 12. The other end of this element, not shown, may be of any suitable or conventional construction such as is now commonly used for hanging a bomb on an aircraft. For illustration, the other end could have an eye or a ring or some such means by which it is attached to the underside of the airplane.

The one-piece stud having a radially outwardly opening socket of my invention may be of either of two forms shown in Figures 1–3 and 4, respectively. In both forms, however, a one-piece headed stud having a shank with a radially outwardly opening socket is inserted in the opening or hole in the bomb wall, the shank being snugly engaged with the tubular casing wall surface defining the opening, and with the stud being riveted in assembly with the casing wall whereby the radially outer end is engaged in a radially outwardly opening casing socket area, as now shall be described in more detail.

Referring to the first form of the invention shown in Figures 2 and 3, it will be noted that the cylindrical wall portion 11 of the casing has an inset flattened portion or bomb casing wall socket area 20 about an aperture 21 therein. This flattened portion defines flat shoulders 22 and 23 on the inner and outer sides of the wall.

Extending through the aperture 21 is the shank 24 of a stud 25 having a head 26 on the inner side of the wall. The head 26 is shouldered at 27 for flush and flat engagement with the inner shouldered surface 22 of the flattened wall area.

This stud 25 has its shank 24 initially provided with a hollow or countersunk area 28 which defines an annular edge or lip 29. In Figure 3 the lip 29 is shown in the position prior to its being flared radially outwardly into interlocking engagement with the inset flattened wall 20 which latter condition is shown in Figure 2. Any suitable riveting apparatus may be employed for riveting the flared edge into shouldered and interlocking cooperation with the inset flattened area 20 of the bomb wall.

By virtue of the fact that the inset shouldered portion 20 has a stepped or tortuous contour, it will be appreciated that the flared lip 29 of the stud shank 24, interlocked therewith, is not only tightly inset in the wall 11 but could be made flush with the outer surface of the wall 11 (Figure 2).

After the stud 25 has been interlocked with the wall the countersunk hole 28 may be tapped and threaded, as indicated at 30 in Figure 2, so as to provide a socket for detachably and threadingly receiving the hanger element 13.

Since it may also be desirable to minimize the likelihood of turning of the stud 25 in the aperture 21, I contemplate providing the edge of the aperture 21 with a radial indentation 31 (Figures 2 and 3), into which a portion of the flared lip 29 can flow or be depressed in the riveting operation. This arrangement acts as a stop to prevent turning of the stud in the hollow or aperture.

In the embodiment of the invention shown in Figure 4 the cylindrical wall 11' does not have any flattened inset so that both the inner and outer surfaces of the wall in engagement with the stud 25' are cylindrical. Here the wall 11' has the aperture or hole 21' leading into an enlarged flared opening 23' at the outer side of the wall 11'. The stud 25' has on the inner side of the wall a head 26' provided with a shoulder 27' which is generally of a curved configuration conforming with the inner cylindrical surface of the wall 11'. Between this shoulder 27' and the wall is a sealing ring or gasket 32 which may be made of copper or any other suitable material. This gasket is disposed around the shank 24' of the stud which extends through the aperture 21'. The outer flared lip or edge 29' of the stud shank is riveted or interlocked with the inclined surface defining the enlarged opening or bomb casing wall socket area 23' radially outwardly of the aperture 21'. The stud is provided with a central threaded socket 30' for detachably receiving the hanger element.

In this latter form of the invention, by virtue of the nested cooperation of the shoulder 27' with the curved or cylindrical inner surface of the wall 11', rotation of the stud in the aperture is prevented.

It will be understood that modifications and variations may be effected without departing from the scope of the novel concepts of the present invention.

I claim as my invention:

1. In a bomb structure, a bomb casing having a cylindrical casing wall with a tubular casing wall surface defining an opening, said bomb casing wall having a radially outwardly opening bomb casing wall socket area with said opening therethrough and having radially outer and radially inner curved casing wall surfaces on opposite sides of said wall about said opening, the radially outer curved casing wall surface defining the radially outwardly opening bomb casing wall socket area, a one-piece stud interlockingly assembled by itself in sealed relation with said bomb casing wall to prevent moisture from moving axially through said opening into the casing including a curved stud head shoulder surface contoured to complement and abut in mated nested relation with said radially inner curved casing wall surface and a shank extending through said opening with the outer periphery of the shank snugly engaged with the tubular casing wall surface defining the opening and with the shank having an outer end, the edge portion of said outer end of said stud being deformed and riveted over said radially outer curved casing wall surface and engaged in the bomb casing wall socket area thereby interlocking the stud with said bomb casing providing a moisture proof connection, said outer end of the stud having a threaded stud socket opening only to the exterior of said casing, and a hanger element for carrying said bomb casing on an air vehicle threaded in said stud socket.

2. In a bomb structure, a bomb casing having a cylindrical casing wall with a series of axially spaced tubular casing wall surfaces each defining an opening, the openings being disposed in axially spaced relation along the length of the cylindrical casing wall and being disposed in a line which is parallel to the axis of the bomb casing, said bomb casing wall having a series of radially outwardly opening bomb casing wall socket areas, the socket areas being disposed at said openings along a line parallel to the axis of the bomb casing, the cylindrical casing wall having radially outer and radially inner curved casing wall surfaces on opposite sides of said wall about said openings, the radially outer curved casing wall surface defining the radially outwardly opening bomb casing wall socket areas, a series of one-piece studs interlockingly assembled in sealed relation with said bomb casing wall to prevent moisture from moving axially through said openings into the casing, each of the studs including a curved stud head shoulder surface contoured to complement and abut in mated nested relation with said radially inner curved casing wall surface and with the stud having a shank extending through said opening with the outer periphery of the shank snugly engaged with the tubular casing wall surface defining the opening and with the shank having an outer end, the edge portion of said outer end of said stud being deformed and riveted over said radially outer curved casing wall surface and engaged in the bomb casing wall socket area thereby interlocking the stud with said bomb casing providing a moisture proof connection at the juncture of each of said studs with said curved casing wall along the length of the bomb casing, the other end of each of the studs having a threaded stud socket opening only to the exterior of said casing, and a series of hanger elements for carrying said bomb casing on an air vehicle threaded in said stud sockets.

References Cited in the file of this patent

UNITED STATES PATENTS

| | | |
|---|---|---|
| 1,180,812 | Wolf | Apr. 25, 1916 |
| 1,394,902 | Hough | Oct. 25, 1921 |
| 1,502,399 | Renner | July 22, 1924 |
| 1,718,610 | Strama | June 25, 1929 |
| 1,873,869 | Carr | Aug. 23, 1932 |
| 1,883,906 | Hasselquist | Oct. 25, 1932 |
| 2,234,667 | D'Amico | Mar. 11, 1941 |
| 2,354,039 | Michell | July 18, 1944 |
| 2,415,695 | Kann | Feb. 11, 1947 |
| 2,583,868 | Mocium | Jan. 29, 1952 |